United States Patent
Kawano

(10) Patent No.: US 11,512,188 B2
(45) Date of Patent: Nov. 29, 2022

(54) SEALING MEMBER

(71) Applicant: JTEKT CORPORATION, Osaka (JP)

(72) Inventor: Yuji Kawano, Naruto (JP)

(73) Assignee: JTEKT CORPORATION, Osaka (JP)

(*) Notice: Subject to any disclaimer, the term of this patent is extended or adjusted under 35 U.S.C. 154(b) by 316 days.

(21) Appl. No.: 16/895,310

(22) Filed: Jun. 8, 2020

(65) Prior Publication Data

US 2020/0399451 A1    Dec. 24, 2020

(30) Foreign Application Priority Data

Jun. 19, 2019   (JP) .............................. JP2019-113607

(51) Int. Cl.
| | |
|---|---|
| *C08K 7/14* | (2006.01) |
| *C08K 3/36* | (2006.01) |
| *C08L 13/00* | (2006.01) |
| *F16J 15/3208* | (2016.01) |

(52) U.S. Cl.
CPC ................ *C08L 13/00* (2013.01); *C08K 3/36* (2013.01); *C08K 7/14* (2013.01); *F16J 15/3208* (2013.01)

(58) Field of Classification Search
CPC .............. C08K 7/14; C08K 3/36; C08L 13/00
See application file for complete search history.

(56) References Cited

U.S. PATENT DOCUMENTS

| | | | | |
|---|---|---|---|---|
| 6,035,899 | A | * | 3/2000 | Ohkoshi ................. F16L 11/08 138/123 |
| 7,799,873 | B2 | * | 9/2010 | Soeda ...................... C08L 77/00 525/333.1 |
| 2008/0071014 | A1 | * | 3/2008 | Ohishi ..................... C08K 5/18 524/258 |
| 2017/0174876 | A1 | * | 6/2017 | Maejima ................... C08L 9/00 |

FOREIGN PATENT DOCUMENTS

| | | |
|---|---|---|
| JP | 2001-348460 A | 12/2001 |
| JP | 2011-241868 A | 12/2011 |

\* cited by examiner

*Primary Examiner* — Dale E Page
*Assistant Examiner* — Wilner Jean Baptiste
(74) *Attorney, Agent, or Firm* — Oliff PLC

(57) ABSTRACT

A sealing member includes a sliding portion made of a vulcanized rubber composition. The rubber composition includes a carboxyl-containing acrylic rubber, a silica, and a glass fiber. A content of the silica is 25 to 100 parts by weight per 100 parts by weight of the carboxyl-containing acrylic rubber.

6 Claims, 3 Drawing Sheets

SEALING MEMBER

CROSS-REFERENCE TO RELATED APPLICATION

This application claims priority to Japanese Patent Application No. 2019-113607 filed on Jun. 19, 2019, incorporated here by reference in its entirety.

BACKGROUND

1. Technical Field

The present disclosure relates to a sealing member such as a rotary shaft lip-type seal.

2. Description of Related Art

A large number of rotary shaft lip-type seals are used in automobiles, including rotary shaft lip-type seals for transmissions and differential gears. There is a demand for rotary shaft lip-type seals used in automobiles to achieve low torque in accordance with a demand for low power consumption as well as a demand for a higher sealing performance against an oil.

As a technique for achieving low torque of a sealing member, a method of reducing friction of a rubber member that slides on a mating member has been proposed. More specifically, for example, a method is known in which a solid lubricant such as graphite, molybdenum disulfide, or polytetrafluoroethylene is added to the rubber member described above (for example, refer to Japanese Unexamined Patent Application Publication No. 2001-348460 (JP 2001-348460 A)). However, a solid lubricant usually develops self-lubricating properties only when a poor lubrication state such as a state when an oil runs out emerges. Therefore, it is difficult to achieve lower friction even when the solid lubricant as described above is added to the rotary shaft lip-type seal that is constantly used under a good lubricant condition achieved by a large amount of oil sealed in an inner space.

Further, as a method of achieving the low torque of the rotary shaft lip-type seals, for example, Japanese Unexamined Patent Application Publication No. 2011-241868 (JP 2011-241868 A) proposes a method of applying satin finish processing and coating processing to a sliding portion of the rotary shaft slip-type seal.

SUMMARY

According to the rotary shaft lip-type seal described in JP 2011-241868 A, because satin finish processing and coating processing are applied to the sliding portion, low torque of the rotary shaft lip-type seal can be achieved by reducing an area of contact between the rotary shaft lip-type seal and the mating member. However, there is a concern that as the coated layer is worn out, a low torque effect vanishes in a short term after such wear occurs.

The present disclosure can provide a sealing member that can maintain low torque over a long period of time, while maintaining the sealing performance.

A sealing member according to an aspect of the present disclosure includes a sliding portion made of a vulcanized rubber composition. The rubber composition includes a carboxyl-containing acrylic rubber, a silica, and a glass fiber. A content of the silica is 25 to 100 parts by weight per 100 parts by weight of the carboxyl-containing acrylic rubber.

The sealing member according to the aspect of the present disclosure includes the sliding portion made of the vulcanized rubber composition, and the vulcanized rubber composition includes the silica and the glass fiber. Therefore, the sealing member according to the aspect of the present disclosure is suitable for low torque. The is because it is considered that generation of protrusions caused by wear of the vulcanized rubber, separation of the silica, and exposure of the glass fiber continuously makes a sliding contact surface sufficiently rough. When the sealing member having the sliding contact surface as described above is used as a rotary shaft lip-type seal, a fluid film is effectively produced between the sliding contact surface and the mating member, which produces good lubricating condition. This results in reduction of shear resistance of the oil, achievement of low torque of the rotary shaft lip-type seal, and maintaining the low torque state. Further, the sealing member contains a predetermined content of the silica, and therefore the sliding portion can have an appropriate tightening force that acts on the mating member, whereby a required sealing performance as the sealing member can be secured.

According to the aspect above, a pH of the silica may be 8 or more and 12 or less. Further, the pH of the silica may be 10 or more and 12 or less. In these cases, it is more suitable to achieve low torque of the sealing member. In the aspect above, in the rubber composition, a content of the glass fiber may be 20 to 40 parts by weight per 100 parts by weight of the carboxyl-containing acrylic rubber. In the aspect above, a content of the silica may be 30 to 80 parts by weight per 100 parts by weight of the carboxyl-containing acrylic rubber. In the aspect above, a content of the silica may be 45 to 65 parts by weight per 100 parts by weight of the carboxyl-containing acrylic rubber.

According to the sealing member of the present disclosure, it is possible to achieve the low torque over a long period of time while maintaining the sealing performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Hereinafter, a sealing member according to embodiments of the present disclosure will be described with reference to the drawings.

Figure 1:
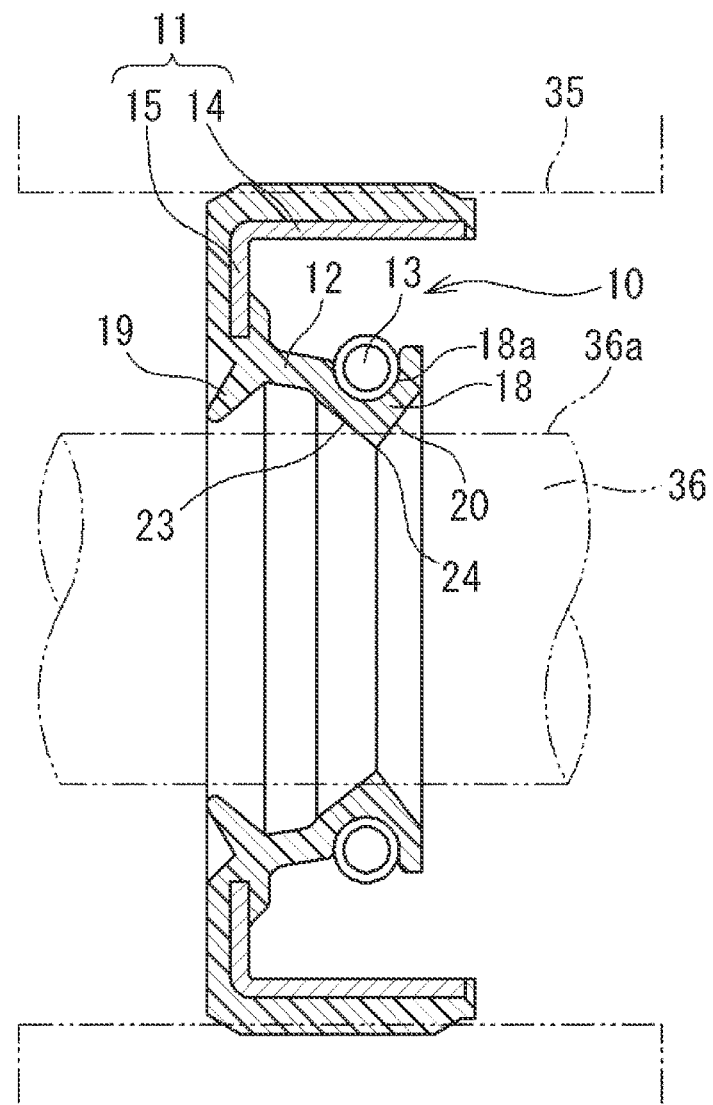
FIG. 1 is a sectional perspective view of a rotary shaft lip-type seal according to a first embodiment of the present disclosure.

FIG. 1 is a sectional view of a rotary shaft lip-type seal according to a first embodiment of the present disclosure. A rotary shaft lip-type seal 10 has an annular shape. An outer peripheral surface of an outer periphery of the rotary shaft lip-type seal 10 is fixed to, for example, a housing 35 of a transmission. A sealing edge 24 in an inner periphery is slidably in contact with a seal land 36a in a shaft surface of a mating member, such as a rotary shaft 36, whereby a lubricant oil, etc., is sealed in a space between the housing 35 and the rotary shaft 36. The rotary shaft lip-type seal 10 is configured of a metal ring 11 and an elastic member 12. The metal ring 11 and the elastic member 12 are bonded by vulcanization. The metal ring 11 is bent in an L shape in a sectional view including a parallel portion 14 that is parallel to an axial direction and a perpendicular portion 15 that is perpendicular to the axial direction. The elastic member 12 is bonded to the metal ring 11 so as to cover an outer peripheral surface of the parallel portion 14 and one side surface of the perpendicular portion 15 in the axial direction, and has a protection lip 19 on a radially inner side and a head section 18 that has the sealing edge 24. The sealing edge 24 functions as the sliding contact portion with the rotary shaft 36. A garter spring 13 is provided on an outer peripheral surface of the head section 18 so as to assist a tightening force.

The protection lip 19 extends toward the rotary shaft 36 such that the protection lip 19 hinders passing of dust between the rotary shaft 36 and the housing 35. The protection lip 19 also extends obliquely in a direction away from the head section 18. The head section 18 is disposed on an inner peripheral side of the parallel portion 14 of the metal ring 11 and has a spring groove 18a for fitting the garter spring 13 on the outer peripheral surface of the head section 18. An inner peripheral surface of the head section 18 is tapered toward a radially inner side. Therefore, two lip side faces 20, 23 are formed on the inner peripheral surface of the head section 18 on respective axial sides with the sealing edge (boundary edge) 24 that is tapered toward the radially inner side serving as a boundary. The lip side faces 20, 23 are inclined in opposite directions from each other.

One of the lip side faces, namely, the lip side face 20 that is disposed away from the protection lip 19 is a fluid side lip face that is disposed on a fluid sealing side, and the other of the lip side faces, namely, the lip side face 23 that is disposed on the protection lip 19 side is an air side lip face. In the head section 18, the sealing edge 24 is a main portion that is slidably in contact with the seal land (shaft surface) 36a of the rotary shaft 36. The head section 18 is curved toward a radially outer side when the sealing edge 24 is brought into contact with the seal land 36a of the rotary shaft 36, and the deformed sealing edge 24, and the fluid side lip face 20 and the air side lip face 23 that are in proximity to the deformed sealing edge 24 are brought into contact with the seal land 36a. In FIG. 1, however, the head section 18 that is not curved is shown.

The elastic member 12 including the head section 18 is made of a vulcanized rubber composition. The rubber composition above contains a carboxyl-containing acrylic rubber, silica, and glass fibers. Here, the content of silica is 25 to 100 parts by weight per 100 parts by weight of the carboxyl-containing acrylic rubber. The rotary shaft lip-type seal 10 includes the elastic member 12 made of the vulcanized rubber composition as described above. Therefore, with the rotary shaft lip-type seal 10, it is possible to maintain the low torque over a long period of time while maintaining superior sealing performance. The sealing edge 24 of the rotary shaft lip-type seal 10 is slidably in contact with the seal land 36a of the rotary shaft 36. This causes continuous generation of protrusions of the sealing edge 24 by wear of the vulcanized rubber, separation of the silica, and exposure of the glass fibers. It is considered that the sealing edge 24 thereby maintains sufficient roughness on its surface. Further, it is considered that the torque of the rotary shaft lip-type seal 10 is lowered as a result, and the state of low torque is maintained over a long period of time.

The rubber composition above will be hereinafter described in detail. The rubber composition contains an unvulcanized carboxyl-containing acrylic rubber, silica, and glass fiber. The carboxyl-containing acrylic rubber is not particularly limited. An example of the carboxyl-containing acrylic rubber is a polymer that is copolymer of a carboxyl-containing monomer and an acrylic monomer. The polymer is represented by a formula (1) below.

[Chemical formula 1]

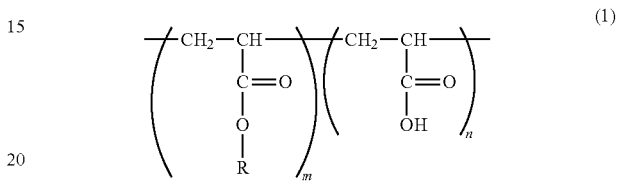

(1)

(In the formula (1), m and n are each independently a positive integer. R is $-C_2H_5$, $-C_4H_9$, or $-C_2H_4OCH_3$.)

In the above formula (1), the ratio of n tom (n/m) is preferably 0.0001 to 0.15. When the above ratio (n/m) is less than 0.0001, mechanical characteristics of the vulcanized rubber composition become insufficient, and an elongation at break of the vulcanized rubber composition is greatly reduced. Therefore, there may be a case where the rotary shaft lip-type seal having the sliding portion that is made of the vulcanized rubber composition above cannot maintain the sealing performance over a long period of time. When the above ratio (n/m) is larger than 0.15, the elongation at break of the vulcanized rubber composition is greatly reduced. Therefore, also in this case, there may be a case where the rotary shaft lip-type seal having the sliding portion that is made of the vulcanized rubber composition above cannot maintain the sealing performance over a long period of time.

In the carboxyl-containing acrylic rubber represented by the above formula (1), a unit having a carboxyl group functions as a cross-linking point, and is heated together with a vulcanizing agent to form a vulcanized rubber. The carboxyl-containing acrylic rubber may be a copolymer formed through chemical reaction of a carboxyl-containing monomer, an acrylic monomer, and a third monomer. Examples of the third monomer include, for example, one of butoxyethyl acrylate, ethylene, and methyl acrylate, etc., or a combination thereof.

A commercially available material may also be used as the carboxyl-containing acrylic rubber above. Examples of the commercially available carboxyl-containing acrylic rubber include, for example, Nipol (registered trademark) AR12, Nipol AR14 (all manufactured by Zeon Corporation), NOXTITE (registered trademark) PA-521, NOXTITEPA-522HF, NOXTITEPA-526, NOXTITEPA-524 (all manufactured by Unimatec Co., Ltd.), and RACRESTER (registered trademark) CH, RACRESTER CT, RACRESTER CUC (all manufactured by Osaka Soda Co., Ltd.). One type of carboxyl-containing acrylic rubber may be used, or two or more types of carboxyl-containing acrylic rubbers may be used concurrently, as the carboxyl-containing acrylic rubber above.

The silica may be any type as long as the type of silica can be added to the rubber composition above. The pH of silica is preferably 8 or more and 12 or less, because it is suitable for achieving the low torque of the rotary shaft lip-type seal. The pH of silica is more preferably 10 or more and 12 or less from the viewpoint of being more suitable for achieving the low torque of the rotary shaft lip-type seal.

In the present disclosure, the pH of the silica is a value obtained by measuring an aqueous suspension containing 4 wt % of the silica using a pH meter. For example, the pH of the silica can be adjusted by adjusting an amount of acid to be added to a alkaline solution when manufacturing the silica.

The shape of the silica is not particularly limited, and may be, for example, spherical. When the silica has a spherical shape, a particle diameter of the silica may be, for example, approximately 5 nm to 20 μm. The particle diameter of the silica is measured based on Japanese Industrial Standard (JIS) Z8825: 2013 "Particle size analysis-laser diffraction methods".

The content of the silica in the rubber composition is 25 to 100 parts by weight per 100 parts by weight of the carboxyl-containing acrylic rubber above. If the content of the silica is less than 25 parts by weight, hardness of the vulcanized rubber composition is not sufficient, which results in insufficient sealing performance of the rotary shaft lip-type seal. On the other hand, when the content of the silica exceeds 100 parts by weight, hardness of the vulcanized rubber composition becomes excessive, and this reduces a followability to the mating member. Therefore, the sealing performance of the rotary shaft lip-type seal becomes insufficient. The content of the silica is preferably 30 to 80 parts by weight, and more preferably, 45 to 65 parts by weight, per 100 parts by weight of the carboxyl-containing acrylic rubber.

The glass fiber may be any type as long as the type of glass fiber can be added to the rubber composition above. The size of the glass fiber is not particularly limited. For example, those having a fiber diameter of 5 to 20 μm, a fiber length of 10 to 400 μm, and an aspect ratio of approximately 2 to 20 are preferable. When such a glass fiber is used together with the silica above, it is suitable for forming an appropriate projection on the sliding contact surface of the rotary shaft lip-type seal based on the glass fiber above.

The fiber length and fiber diameter of the above glass fibers are determined by observing 100 glass fibers selected at random using a microscope, measuring the fiber length and fiber diameter of each glass fiber, and calculating an average value of each of the fiber length and fiber diameter. For this observation, an optical microscope and a scanning electron microscope, etc. may be used as the microscope. The aspect ratio of the glass fiber is a value obtained by dividing the fiber length by the fiber diameter.

The content of the glass fibers in the rubber composition above is preferably 20 to 40 parts by weight per 100 parts by weight of the carboxyl-containing acrylic rubber above. When the content of the glass fiber is included within this range, it is suitable to form protrusions and recesses that are appropriate for achieving the low torque on the sliding contact surface of the rotary shaft lip-type seal, while obtaining hardness of the vulcanized rubber composition in the rotary shaft lip-type seal, which is appropriate for achieving the sealing performance.

The glass fiber above is preferably a glass fiber to which a surface treatment using a silane coupling agent is applied. In this case, a tensile strength at break (Tb) and an elongation at break (Eb) of the vulcanized rubber composition composing the elastic member 12 are improved, and therefore, the rotary shaft lip-type seal is more suitable for maintaining low torque over a long period of time.

The rubber composition further contains a vulcanizing agent. The vulcanizing agent may be any agent such as an amine vulcanizing agent, as long as the agent can cross-link the carboxyl-containing acrylic rubber. Further, the rubber composition may optionally contain a vulcanization accelerator such as a guanidine compound, a sulfenamide compound, 1,8-Diazabicyclo[5.4.0]undec-7-ene, and a tertiary amine, a processing aid such as a saturated fatty acid (for example, stearic acid) and a microcrystalline wax, and an antioxidant may be contained. Further, the rubber composition may contain other known additives, etc., contained in the rotary shaft lip-type seals.

Durometer hardness type A of the vulcanized rubber composition is preferably A65 to A75. When the durometer hardness type A of the vulcanized rubber composition is less than A65, the tightening force of the elastic member 12 against the mating member (rotary shaft 36) becomes insufficient, which may cause oil leakage. On the other hand, when the durometer hardness type A of the vulcanized rubber composition exceeds A75, the followability of the elastic member 12 to the mating member becomes insufficient, which may cause oil leakage as well. The durometer hardness type A may be measured by a method that complies with JISK6253-3: 2012.

The tensile strength at break (Tb) of the vulcanized rubber composition is preferably 8.0 MPa or more. The elongation at break (Eb) of the vulcanized rubber composition is preferably 100% or more. When the vulcanized rubber composition satisfies the tensile characteristics above, the elastic member 12 has a sufficient mechanical strength and is suitable for securing the sealing performance as the rotary shaft lip-type seal over a long period of time. The tensile strength at break (Tb) and the elongation at break (Eb) may be measured by a method that complies with JISK6251: 2017.

The rotary shaft lip-type seal 10 according to the first embodiment can be manufactured, for example, through the following processes. First, a rubber composition is prepared to contain the unvulcanized carboxyl-containing acrylic rubber, the silica, the glass fibers, and various additives such as the vulcanizing agent, and further, the vulcanization accelerator and the processing aid to be added as necessary. The rubber composition is prepared by measuring the contents of ingredients in advance and kneading the ingredients by a mixer, for example, a roll mill or a kneader.

Next, the rubber composition is cast into a metal mold and vulcanized under a predetermined condition. In this process, when the rubber composition is vulcanized and molded, it is preferable that the metal ring 11 is placed in the metal mold in advance such that the metal ring 11 and elastic member 12 are bonded to each other by vulcanization. This makes it possible to reduce the number of manufacturing steps.

After the process above, the molded article is taken out of the metal mold, and the garter spring 13 is fitted to the molded article, whereby the rotary shaft lip-type seal 10 is finished.

OTHER EMBODIMENTS

The sealing member according to the embodiments of the present disclosure is not limited to the rotary shaft lip-type seal, and may be other seal members such as a dust seal, for example.

The present disclosure will be hereinafter described in detail with reference to examples. However, the embodiments of the present disclosure are not limited to the examples described below. In each of the examples and comparative examples, the rotary shaft lip-type seal having the configuration shown in FIG. 1 and a sheet for measuring physical properties are produced.

In the examples and comparative examples, the carboxyl-containing acrylic rubber, the silica, and the glass fiber used in preparation of the rubber composition are as follows:

Carboxyl-containing acrylic rubber: Nipol AR12 (manufactured by Zeon Corporation);

Silica: Carplex (registered trademark) 1120 (manufactured by Evonik Japan), pH=10.7; Nipsil (registered trademark) ER (manufactured by Tosoh Silica Corporation), pH=8.3; Nipsil VN3 (manufactured by Tosoh Silica Corporation), pH=6.0; and Glass fiber: MHO6JB1-20 (manufactured by Asahi Fiber Glass Co., Ltd.), fiber diameter=10 μm, fiber length=63 μm.

Example 1

(1) 100 parts by weight of the carboxyl-containing acrylic rubber (Nipol AR12), 55 parts by weight of the silica (Carplex 1120), 35 parts by weight of the glass fiber (MH06JB1-20), and 25.6 parts by weight of the additives (e.g., the vulcanizing agent, the vulcanizing accelerator, and the processing aid) were kneaded by a roll mill and the rubber composition were obtained.

(2-1) After the rubber composition obtained in the (1) above were cast in a metal mold in which a metal ring was placed, primary vulcanization was applied to the rubber composition in the metal mold under a heating condition where the temperature was 180° C. and the duration was four hours, and secondary vulcanization was applied to the rubber composition under the heating condition where the temperature was 180° C. and the duration was four hours to produce the rotary shaft lip-type seal having the geometry shown in FIG. 1.

(2-2) Apart from the (2-1) above, the rubber composition obtained in the (1) above was vulcanized and molded into a sheet using the metal mold under the above heating condition, and a sheet having 2 mm of thickness of the vulcanized rubber composition was produced.

Example 2

The rotary shaft lip-type seal and the sheet were produced in the same processes as those in the example 1 except that the added silica was changed to "Nipsil ER".

Example 3

The rotary shaft lip-type seal and the sheet were produced in the same processes as those in the example 1 except that the content of the added glass fiber was changed to 50 parts by weight.

Example 4

The rotary shaft lip-type seal and the sheet were produced in the same processes as those in the example 1 except that the added silica was changed to "Nipsil VN3".

Comparative Example 1

The rotary shaft lip-type seal and the sheet were produced in the same processes as those in the example 1 except that the glass fiber was not added.

Comparative Example 2

The rotary shaft lip-type seal and the sheet were produced in the same processes as those in the example 2 except that the glass fiber was not added.

Comparative Example 3

The rotary shaft lip-type seal and the sheet were produced in the same processes as those in the example 4 except that the glass fiber was not added.

The evaluations below were conducted using the rotary shaft lip-type seal and the sheet that were produced in each of the examples and the comparative examples. The results are shown in Table 1.

Evaluation Using Sheet (1-1) Durometer hardness type A: The sheet was cut out into a rectangle having first side being 30 mm and second side being 50 mm, and the durometer hardness type A was measured using a type-A durometer by a method that complies with "JISK6253-3: 2012". The measurement was performed by stacking three test pieces.

(1-2) Tensile strength at break (Tb) and elongation at break (Eb): A sheet was cut out to prepare a dumbbell-shaped No. 3 test piece. A tensile test complying with "JISK6251: 2017" was conducted using the prepared test piece. In this test, the tensile speed was set to 500 mm/min, and the number of test pieces was three.

Figure 2:
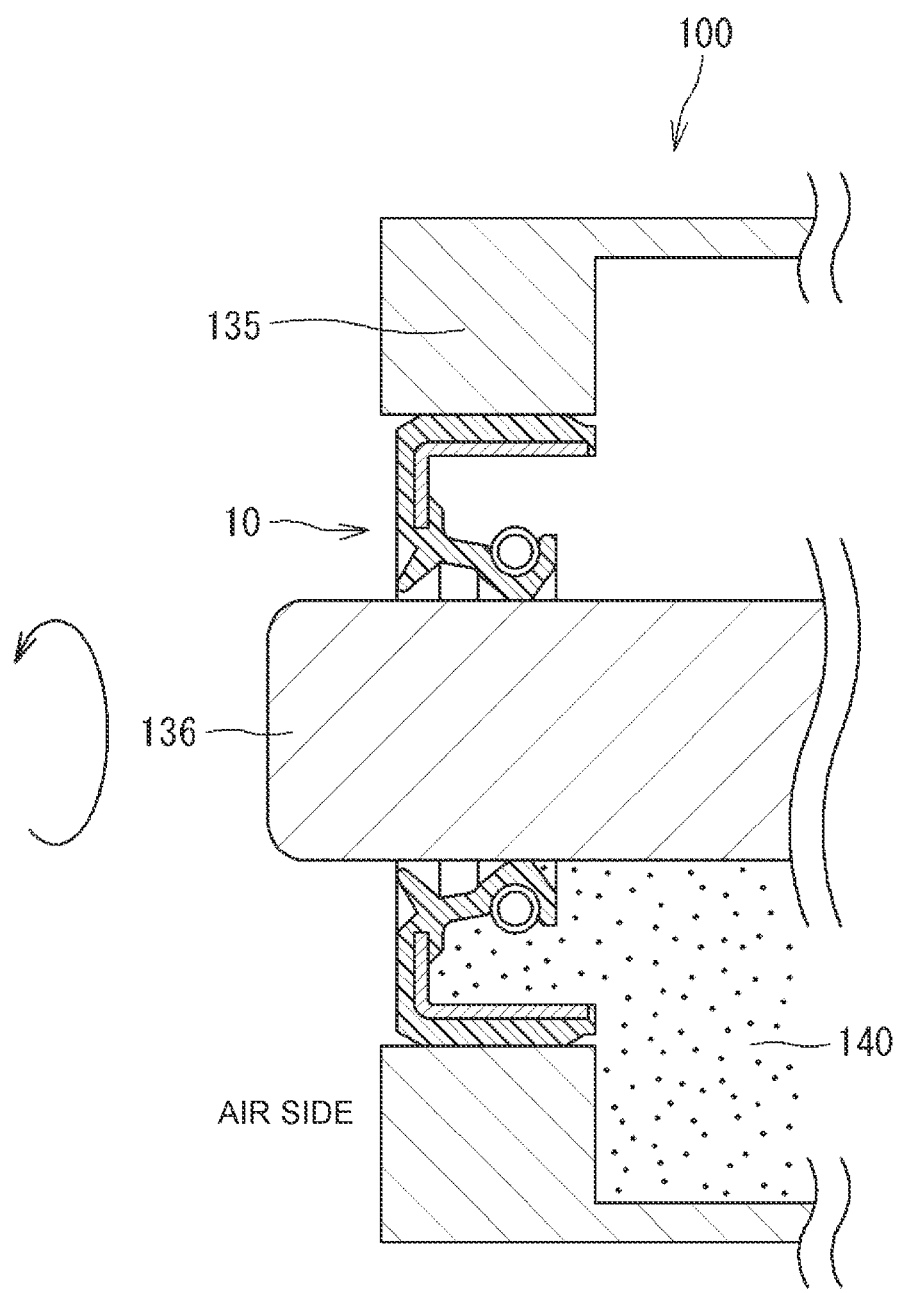
FIG. 2 is a sectional view schematically showing a part of a seal torque tester used for measurement of torque in examples and comparative examples.

Evaluation Using Rotary Shaft Lip-Type Seal (2-1) Torque: As shown in FIG. 2, the inner periphery of the rotary shaft lip-type seal 10 was fitted on the outer periphery of a rotary shaft 136 while the outer periphery of the rotary shaft lip-type seal 10 was fixed to a housing 135 of a seal torque tester 100. In this state, the rotary shaft 136 was rotated with an oil 140 sealed between the housing 135 and the rotary shaft 136. The torque [mN·m] was measured under this condition using a load cell (not illustrated). In this evaluation, the test conditions adopted are as follows:

Test temperature: Room temperature (25° C.);

Circumferential speed: 4.5 m/s;

Run-in test: 30 min.; and

Torque test: 2 min.

Figure 3:
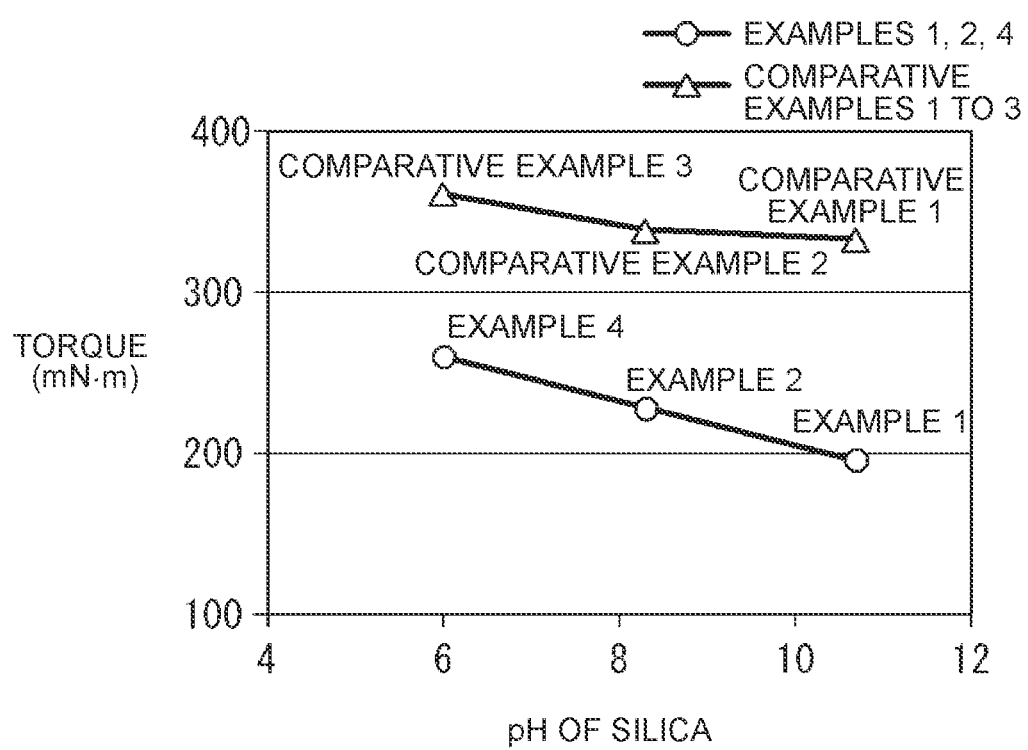
FIG. 3 is a graph showing a relationship between the torque of the rotary shaft lip-type seals produced in the examples and the comparative examples and a pH of silica.

The results are shown in Table 1 and FIG. 3.

According to the evaluation results, it has been proved that the rotary shaft lip-type seals of the examples 1 to 4 can contribute achievement of the low torque.

TABLE 1

|  |  | Example 1 | Example 2 | Example 3 | Example 4 | Comparative example 1 | Comparative example 2 | Comparative example 3 |
| --- | --- | --- | --- | --- | --- | --- | --- | --- |
| Rubber component | Carboxyl-containing acrylic rubber (unvulcanized) | 100 | 100 | 100 | 100 | 100 | 100 | 100 |
| Filler | Silica (pH 10.7) | 55 | — | 55 | — | 55 | — | — |
|  | Silica (pH 8.3) | — | 55 | — | — | — | 55 | — |
|  | Silica (pH 6.0) | — | — | — | 55 | — | — | 55 |
|  | Glass fiber | 35 | 35 | 50 | 35 | — | — | — |
| Processing aid, vulcanizing agent, and vulcanizing accelerator, etc. | | 25.6 | 25.6 | 25.6 | 25.6 | 25.6 | 25.6 | 25.6 |
| Durometer hardness type A (A) | | 70 | 73 | 65 | 75 | 58 | 66 | 72 |
| Tensile strength at break (Mpa) | | 8.9 | 8.0 | 6.8 | 8.1 | 7.7 | 9.3 | 11.8 |
| Elongation at break (%) | | 166 | 114 | 195 | 120 | 156 | 133 | 227 |
| Torque (mN · m) | | 195.0 | 228.3 | 228.0 | 260.1 | 334.8 | 340.0 | 363.3 |

* The contents in the table are described in a unit of "part by weight".

What is claimed is:

1. A sealing member, comprising:
a sliding portion made of a vulcanized rubber composition, wherein:
the rubber composition includes a carboxyl-containing acrylic rubber, a silica, and a glass fiber;
a content of the silica is 25 to 100 parts by weight per 100 parts by weight of the carboxyl-containing acrylic rubber; and
a pH of the silica is 8 or more and 12 or less.

2. The sealing member according to claim 1, wherein the pH of the silica is 10 or more and 12 or less.

3. The sealing member according to claim 2, wherein in the rubber composition, a content of the glass fiber is 20 to 40 parts by weight per 100 parts by weight of the carboxyl-containing acrylic rubber.

4. The sealing member according to claim 1, wherein in the rubber composition, a content of the glass fiber is 20 to 40 parts by weight per 100 parts by weight of the carboxyl-containing acrylic rubber.

5. The sealing member according to claim 1, wherein a content of the silica is 30 to 80 parts by weight per 100 parts by weight of the carboxyl-containing acrylic rubber.

6. The sealing member according to claim 1, wherein a content of the silica is 45 to 65 parts by weight per 100 parts by weight of the carboxyl-containing acrylic rubber.

* * * * *